United States Patent Office 3,642,778
Patented Feb. 15, 1972

3,642,778
BENZIMIDAZO[1,2-d][1,4]BENZODIAZEPIN-6(5H)-ONES
Grover Cleveland Helsley, Richmond, Va., assignor to
A. H. Robins Company, Inc., Richmond, Va.
No Drawing. Filed Oct. 22, 1969, Ser. No. 868,643
Int. Cl. C07d 57/02
U.S. Cl. 260—239.3                                5 Claims

ABSTRACT OF THE DISCLOSURE

Benzimidazo[1,2-d][1,4]benzodiazepin - 6(5H) - ones substituted in the 2 and 5 positions and useful as antidepressants are disclosed. The compounds are prepared by reacting [1,2-d][1,4]benzodiazepin - 6(5H) - ones with compounds having a replaceable halogen atom.

---

The present invention relates to novel benzimidazo[1,2d][1,4]benzodiazepin-6(5H)-ones. In particular, the present invention relates to novel 5-substituted benzimidazo[1,2d][1,4]benzodiazepin-6(5H)-ones, novel intermediates useful in producing such compounds and to methods of making and using them.

The product compounds of the invention are represented by the following structural formula:

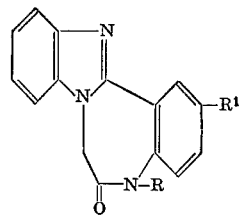

Formula I wherein;

R is selected from hydrogen, phenyl-lower alkyl, lower alkyl, ω-diloweralkylaminoalkyl and 2-morpholinoethyl;
R¹ is hydrogen, chlorine, bromine, and pharmaceutically acceptable acid addition salts thereof.

A preferred group of compounds is represented by Formula II:

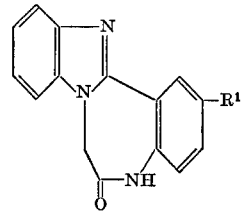

wherein R¹ is as defined above.

The compounds of the present invention are antidepressants. They are active in mice and rats in oral and intraperitoneal doses of 2–50 mg./kg. when evaluated in the standard dose range in which the animals are administered a compound and observed for behavioral effects. They may be formulated for use by incorporating them into standard pharmaceutical dosage forms such as capsules, tablets and injectables containing 0.1 to 500 mg./kg., the exact dosage varying with the weight and age of the subject being treated and the severity of the condition. Among the pharmaceutical excipients which may be used are lactose, talc, gelatin, and magnesium stearate.

It is, therefore, an object of the present invention to provide novel benzimidazo[1,2d][1,4]benzodiazepin-6(5H)-ones useful as antidepressants. Another object is to provide novel compositions having as active ingredients the novel compounds of the present invention. Additional objects will be apparent to those skilled in the art, and still other objects will become apparent hereinafter.

In the definition of the symbols in the foregoing Formula I, and where they appear elsewhere throughout the specification and claims thereof, the terms used herein have the following significance.

The term "lower alkyl" includes straight and branched chain radicals of up to eight carbon atoms inclusive and is exemplified by such groups as methyl, ethyl, propyl, isopropyl, butyl, isobutyl, tertiary butyl, amyl, isoamyl, hexyl, heptyl, octyl, and the like.

When halogen is referred to herein, preferably but not necessarily, the halogen of atomic weight in excess of eighteen and not greater than eighty is employed.

The term "phenyl" as used herein includes the unsubstituted phenyl radical and substituted phenyl radicals. Among the suitable substituted phenyl radicals are phenyl radicals which are substituted by any radical or radicals which are not reactive or otherwise interfering under the conditions or reaction in preparing the desired compounds, such radicals including lower alkoxy, lower alkyl, trifluoromethyl, halo, and the like. The substituted phenyl radicals have preferably 1 to 3 substituents such as those given above and, moreover, these substituents can be in various positions available of a phenyl nucleus and, when more than one substituent is present, can be the same or different and can be in various position combinations relative to each other. The lower alkoxy and lower alkyl substituents each have preferably from one to four carbon atoms which can be arranged as straight and branched chains. A total of nine carbon atoms in all ring substituents, making a total of 15 carbon atoms in the radical, is the preferred maximum.

Included in the term "phenyl alkyl" are groups such as benzyl, phenethyl, methylbenzyl, phenpropyl, and the like.

The pharmaceutically acceptable acid addition salts include the organic and inorganic acid addition salts, e.g., those prepared from mineral acids such as hydrochloric acid and hydrobromic acid and from organic acids such as maleic, fumaric, succinic, citric, and the like.

The compounds are prepared in the following manner, reference being made to Chart A below.

CHART A

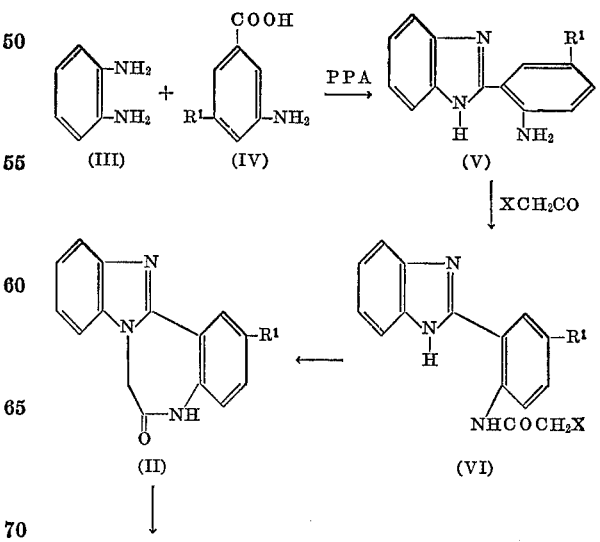

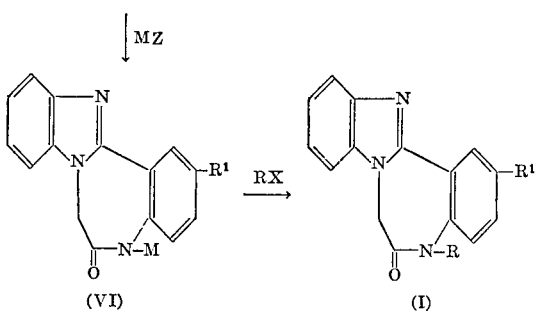

R and R¹ are as defined above, MZ is an alkali metal hydride or amide, and X is halogen. o-Aminobenzoic acid (IV), optionally substituted at the 5-position, is reacted with o-phenylenediamine (III) in a large excess of polyphosphoric acid at about 250° C. for a period of from about three to about six hours. The cooled acid reaction mixture is made basic using a strong base such as sodium hydroxide. The base insoluble 2-(o-aminophenyl)benzimidazole (V) separates from the basic mixture as a crystalline solid which can be purified by crystallization from a suitable solvent.

The 2-(o-aminophenyl)benzimidazoles (V) are reacted with a halocetyl halide to give the 2-(o-halocetamidophenyl)benzimidazoles (VI). The reaction is run in a buffered solution, illustratively, acetic acid-sodium acetate, to bind the free hydrogen halide produced and prevent cyclization to a quinazoline structure. The reaction is generally run at or near room temperature and is usually completed with a short period of time. The reaction mixture is poured into a large excess of water which causes precipitation of the water insoluble 2-(o-haloacetamidophenyl)benzimidazole (VI) as a crystalline material. In an alternate method of preparation a 2-(o-aminophenyl)benzimidazole is added to a heterogeneous mixture of a water insoluble organic solvent and water, illustratively, chloroform and water containing an alkali metal base such as sodium carbonate. The haloacetyl halide is added to the well-stirred heterogenous mixture and as the reaction between the 2-(o-aminophenyl)benzimidazole and the haloacetyl halide occurs, the hydrogen halide is neutralized in the aqueous phase by the alkali metal base and the 2-(o-haloacetamidophenyl)benzimidazole (VI) is dissolved in the organic phase. The organic and aqueous phases are separated and the product is isolated by evaporation of the solvent from the organic phase which leaves the 2-(o-haloacetamidophenyl) benzimidazole as a crystalline residue.

The benzimidazo[1,2d][1,4]benzodiazepin-6(5H)-ones (II) are prepared by cyclizing the 2-(o-haloacetamidophenyl)benzimidazoles (VI) using a cyclizing agent, such as sodium hydride, heating at an elevated temperature in a high boiling liquid or by fusion. When cyclization is effected in a high boiling solvent such as diethyl benzene, a solution of the 2-(o-haloacetamidophenyl)benzimidazole (VI) in the solvent is refluxed for a period of from about two to about six hours. The cyclized products benzimidazo[1,2d][1,4]benzodiazepin-6(5H)-one (II) is isolated by evaporation of the solvent, dissolving the residual mass in a lower alkanol such as ethanol, neutralizing the alkanol solution and adding a large excess of water to the neutral alkanol solution which causes precipitation of the product.

The benzimidazo[1,2d][1,4]benzodiazepine-6(5H)-ones (II) can be prepared by fusion of the 2-(o-haloacetamidophenyl)benzimidazoles (VI) at a temperature of from about 170° C. to about 200° C.

In a preferred procedure a mixture of a 2-(o-haloacetamidophenyl)benzimidazole (VI), sodium hydride and dimethylformamide is refluxed for a period of from about three hours to about five hours. The cooled reaction mixture is filtered, the filtrate concentrated at reduced pressure and the residual benzimidazo[1,2d][1,4]benzodiazepin-6(5H)-one (II) is crystallized from a suitable solvent.

The 5-substituted benzimidazo]1,2d][1,4]benzodiazepin 6(5H)-ones (I) are prepared by reacting a benzimidazo[1,2d][1,4]benzodiazepin-6(5H)-one with an alkali metal hydride or amide such as sodium hydride, sodium amide, lithium hydride or lithium amide in an inert organic solvent such as toluene to give a 5-metallobenzimidazo[1,2d][1,4]benzodiazepin-6(5H)-one (VI) which is then reacted with a compound having a replaceable halogen atom to split out the elements of a metal halide. The reaction is run at a temperature of from about 50° C. to about 80° C. for a period of from about two hours to about 16 hours. The 5-substituted benzimidazo[1,2d][1,4]benzodiazepin-6-(5H)-one is isolated by concentration of the reaction mixture, acid-base extraction of the crude residue and conversion of the basic product to an acid addition salt which is purified by crystallization from a suitable solvent.

PREPARATION OF INTERMEDIATES

Preparation 1

2-(o-aminophenyl)benzimidazole.—A mixture of 68.5 g. (0.5 mole) of o-aminobenzoic acid, 54.1 g. (0.5 mole) of o-phenylenediamine and 1000 g. of polyphosphoric acid was heated at 250° C. for four hours with stirring, cooled and poured onto 4,000 ml. of cold water. The mixture was then filtered and the filtrate made basic with 50% sodium hydroxide solution. The product which formed was separated by filtration and recrystallized from methanol-isopropanol. The compound weighed 24 g. (23% yield) and melted at 209–211° C.

Analysis. — Calculated for $C_{13}H_{11}N_3$ (percent): C, 74.62; H, 5.30. Found (percent): C, 74.86; H, 5.35.

Preparation 2

2-(2-amino-5-chlorophenyl)benzimidazole.—A mixture of 50 g. (0.29 mole) of 5-chloro-2-aminobenzoic acid, 37.8 g. (0.35 mole) of o-phenylenediamine and 1000 g. of polyphosphoric acid was stirred at 250° C. for four hours. The reaction mixture was cooled, diluted with four liters of water and filtered. Basifying the filtrate using 50% sodium hydroxide solution precipitated the product which was collected and dried. The product (15.4 g.) melted at 228–235° C.

Preparation 3

2 - (2-amino-5-bromophenyl)benzimidazole.—When an equimalor amount of 5-bromo-2-aminobenzoic acid is used in the procedure of Preparation 2, 2-(2-amino-5-bromophenyl)benzimidazole is obtained.

Preparation 4

2 - (o - chloroacetamidophenyl)benzimidazole.—To a stirred solution of 30.0 g. (0.14 mole) of 2-(o-aminophenyl)benzimidazole in 400 ml. of acetic acid and 40 ml. of saturated sodium acetate solution at room temperature was added slowly 31.6 g. (0.28 mole) of chloroacetyl chloride. After the addition was complete, the reaction mixture was stirred for 30 minutes and then treated with one liter of water and 20 g. of sodium acetate. The crystalline product which formed weighed 36 g. (90% yield) and melted with decomposition at about 160° C. The decomposition point did not change after recrystallization.

Analysis.—Calculated for $C_{15}H_{12}N_3Cl$ (percent): C, 63.04; H, 4.23; N, 14.71. Found (percent): C, 62.81; H, 4.34; N, 14.52.

Preparation 5

When in the procedure of Preparation 4, 2-(o- aminophenyl)benzimidazole is replaced by an equimolar amount of:

2-(2-amino-5-chlorophenyl)benzimidazole and
2-(2-amino-5-bromophenyl)benzimidazole there is obtained:

2-(2-chloroacetamido-5-chlorophenyl)benzimidazole and
2-(2-chloroacetamido-5-bromophenyl)benzimidazole.

EXAMPLE 1

Benzimidazo[1,2d,[1,4]benzodiazepin-6(5H)-one

Procedure A.—A solution of 3.0 g. (0.011 mole) of 2-(o-chloroacetamidophenyl)benzimidazole in one liter of diethylbenzene was refluxed for two hours and then the solvent was evaporated at reduced pressure. The residue was dissolved in hot 95% ethanol, the solution basefied with 3 N sodium hydroxide and filtered. The precipitate which formed when the filtrate was treated with cold water was separated by filtration and washed with cold water. After the white product was recrystallized from benzene it melted at 261.5–263° C. and weighed 0.7 g. (27% yield).

Analysis.—Calculated for $C_{15}H_{11}N_3O$ (percent): C, 72.27; H, 4.45; N, 16.86. Found (percent): C, 72.31; H, 4.56; N, 16.82.

Procedure B.—2-(o-chloroacetamidophenyl)benzimidazole was fused at 170–200° C. until aliquot analysis indicated the cyclization was completed. The benzimidazo[1,2d][1,4]benzodiazepin-6(5H)-one prepared in this manner melted at 260–262° C.

Procedure C.—A mixture of 22.0 g. (0.078 mole) of 2-(o-chloroacetamidophenyl)benzimidazole, 3.6 g. (0.085 mole) of sodium hydride and 1600 ml. of dimethylformamide was stirred at the reflux temperature for three hours. The cooled mixture was filtered, the filtrate concentrated at reduced pressure and the residue crystallized from xylene-isopropanol to give 9.1 g. (46%) of benzimidazo[1,2d][1,4]benzodiazepin-6(5H) - one which melted at 257–261° C.

EXAMPLE 2

5-(2-dimethylaminoethyl)benzimidazo[1,2d][1,4]benzodiazepin-6(5H)-one dihydrochloride To a stirred solution of 3.6 g. (0.015 mole) of benzimidazo[1,2d][1,4]benzodiazepin-6(5H)-one in 100 ml. of dimethylformamide was added 1.3 g. (0.030 mole) of a 53% dispersion of sodium hydride in mineral oil. After the mixture was stirred for 30 minutes, a solution of 2.3 g. (0.016 mole) of 2-dimethylaminoethyl chloride in 70 ml. of dimethylformamide was added slowly. Stirring was continued and the mixture was heated to 70–80° C. for 16 hours, filtered and the solvent evaporated at reduced pressure. The residual oil was taken up in benzene and the resulting solution extracted with 6 N hydrochloric acid. The acid extract was made basic with 6 N sodium hydroxide and the oil which separated was extracted with benzene. The combined extracts were washed with water, dried over magnesium sulfate and the solvent evaporated. The residual oil was dissolved in isopropanol and treated with ethereal hydrogen chloride. The white crystalline product which formed weighed 2.0 g. (34% yield) and melted with decomposition at 277–280° C. after crystallization from an isopropanol-methanol mixture.

Analysis.—Calculated for $C_{19}H_{22}Cl_2N_4O$ (percent): C, 58.02; H, 5.64; N, 14.25. Found (percent): C, 57.83; H, 5.62; N, 14.23.

EXAMPLE 3

5-(3-dimethylaminopropyl)benzimidazo[1,2d][1,4]benzodiazepin-6(5H)-one dihydrochloride To a stirred solution of 4.0 g. (0.016 mole) of benzimidazo[1,2d][1,4]benzodiazepin-6(5H)-one in 100 ml. of dimethylformamide was added 0.72 g. (0.016 mole) of a 53% dispersion of sodium hydride in mineral oil. The mixture was stirred 30 minutes and then a solution of 2.2 g. (0.018 mole) of 3-dimethylaminopropyl chloride in 10 ml. of toluene was added slowly. Stirring was continued and the mixture was heated to 70–75° C. for 16 hours, filtered and the solvent evaporated at reduced pressure. The residual oil was taken up in benzene and the resulting solution extracted with hydrochloric acid. The acid extract was made basic with 6 N sodium hydroxide and the oil which separated was extracted with benzene. The combined extracts were washed with water, dried over magnesium sulfate and the solvent evaporated. The residual oil was dissolved in isopropanol and treated with ethereal hydrogen chloride. The white crystalline product which formed weighed 5.0 g. (77% yield) and melted with decomposition at 265–267° C. after recrystallization from an isopropanol-methanol mixture.

Analysis.—Calculated for $C_{20}H_{24}N_4OCl_2$ (percent): C, 58.97; H, 5.94; N, 13.76. Found (percent): C, 58.80; H, 5.94; N, 13.69.

EXAMPLE 4

When, in the procedure of Example 3, 3-dimethylaminopropyl chloride is replaced by equimolar amounts of:

2-morpholinoethyl bromide,
3-diethylaminopropyl chloride,
2-diethylaminoethyl chloride,
benzyl bromide
phenethyl bromide,
methyl iodide,
ethyl bromide and
propyl bromide there is obtained:

5-(2-morpholinoethyl)benzimidazo[1,2d][1,4]benzodiazepin-6(5H)-one,
5-(3-diethylaminopropyl)benzimidazo[1,2d][1,4]benzodiazepin-6(5H)-one,
5-(2-diethylaminoethyl)benzimidazo[1,2d][1,4]benzodiazepin-6(5H)-one,
5-benzylbenzimidazo[1,2d][1,4]benzodiazepin-6(5H)-one,
5-phenethylbenzimidazo[1,2d][1,4]benzodiazepin-6(5H)-one,
5-methylbenzimidazo[1,2d][1,4]benzodiazepin-6(5H)-one,
5-ethylbenzimidazo[1,2d][1,4]benzodiazepin-6(5H)-one, and
5-propylbenzimidazo[1,2d][1,4]benzodiazepin-6(5H)-one.

What is claimed is:

1. A compound selected from benzimidazo[1,2d][1,4]benzodiazepin-6(5H)-ones having the formula:

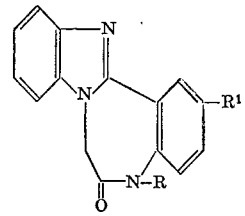

wherein;
R is selected from the group consisting of hydrogen, phenyl-lower alkyl wherein the phenyl group is unsubstituted or is substituted with up to three substituents selected from the group consisting of loweralkoxy, lower alkyl, trifluoromethyl and halo, lower alkyl, 2-dimethyl aminoethyl, 3-dimethylaminopropyl and 2-morpholinoethyl, $R^1$ is selected from the group consisting of hydrogen, chlorine and bromine, and pharmaceutically acceptable acid addition salts thereof.

2. A compound of claim 1 which is benzimidazo[1,2d][1,4]benzodiazepin-6(5H)-one.

3. A compound of claim 1 which is 5-(3-dimethylaminopropyl)benzimidazo[1,2d] [1,4]benzodiazepin - 6(5H)-one.

4. A compound of claim 1 which is [5-(3-dimethylaminoethyl)]5-(2 - dimethylaminoethyl)benzimidazo[1,2d][1,4]benzodiazepin-6(5H)-one.

5. A process for the preparation of benzimidazo[1,2d][1,4]benzodiazepin-6(5H)-ones having the formula:

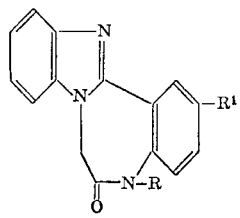

wherein;

R is selected from the group consisting of hydrogen, phenyl-lower alkyl wherein the phenyl group is unsubstituted or is substituted with up to three substitutents selected from the group consisting of loweralkoxy, lower-alkyl, trifluoromethyl and halo, lower alkyl, 2-dimethyl aminoethyl, 3-dimethylaminopropyl and 2-morpholinoethyl, $R^1$ is selected from the group consisting of hydrogen, chlorine and bromine, which comprises the steps of:

(1) cyclizing a 2-(2-haloacetamido-5-substituted phenyl)benzimidazole by heating at a temperature of from about 170° C. to about 200° C. with or without a solvent or by heating in refluxing dimethylformamide in the presence of sodium hydride to a 2-substituted benzimidazo[1,2d][1,4]benzodiazepin-6(5H)-one of the formula:

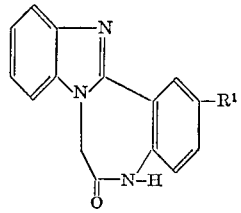

wherein $R^1$ is as defined above, and the further step of:

(2) metallating the 2-substituted benzimidazo[1,2][1,4]benzodiazepin-6(5H)-one of step (1) at 50° C. to 80° C. in an inert organic solvent using an alkali metal hydride or amide and contacting the metallated compound with a compound RX at 50° C. to 80° C. wherein R is defined as above and X is halogen to give a benzimidazo[1,2d][1,4]benzodiazepin-6(5H)-one of the formula:

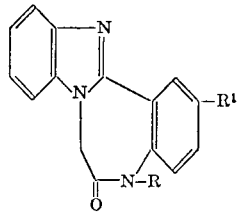

wherein R and $R^1$ are as defined above.

References Cited

UNITED STATES PATENTS 3,505,315   4/1970   Bell _____ 260—239.3

HENRY R. JILES, Primary Examiner

R. T. BOND, Assistant Examiner

U.S. Cl. X.R.

424—244, 273

UNITED STATES PATENT OFFICE
CERTIFICATE OF CORRECTION

Patent No. 3,642,778          Dated Feb. 15, 1972

Inventor(s) Grover Cleveland Helsley

It is certified that error appears in the above-identified patent and that said Letters Patent are hereby corrected as shown below:

Column 2, under Formula V, change "XCH$_2$CO" to read --XCH$_2$COX--. Column 3, line 28, change "halocetyl" to --haloacetyl--; and "2-(o-halocetamidophenyl" to --2-(o-haloacetamidophenyl--; line 34, change "with" to --within--; line 61, change "products" to --product--.

Signed and sealed this 8th day of August 1972.

(SEAL)
Attest:

EDWARD M. FLETCHER, JR.          ROBERT GOTTSCHALK
Attesting Officer                Commissioner of Patents